(12) United States Patent
Huss et al.

(10) Patent No.: US 9,895,753 B2
(45) Date of Patent: Feb. 20, 2018

(54) MANUAL CLAMP FOR KEY MAKING MACHINE

(71) Applicant: The Hillman Group, Inc., Cincinnati, OH (US)

(72) Inventors: James F. Huss, Scottsdale, AZ (US); Robert J. Musil, Phoenix, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 0 days.

(21) Appl. No.: 15/284,239

(22) Filed: Oct. 3, 2016

(65) Prior Publication Data

US 2017/0136557 A1    May 18, 2017

Related U.S. Application Data

(60) Provisional application No. 62/256,236, filed on Nov. 17, 2015.

(51) Int. Cl.
*B23C 3/35* (2006.01)

(52) U.S. Cl.
CPC .......... *B23C 3/355* (2013.01); *B23C 2235/41* (2013.01); *B23C 2260/76* (2013.01); *B23C 2270/08* (2013.01); *Y10T 409/300952* (2015.01)

(58) Field of Classification Search
CPC . Y10T 409/300952; Y10T 409/301008; Y10T 409/301064; B23C 3/35; B23C 3/355; B23C 2235/41; B23C 2270/08; B25B 5/068
USPC .................................... 269/157, 158, 254 CS
See application file for complete search history.

(56) References Cited

U.S. PATENT DOCUMENTS

| 488,058 | A | * | 12/1892 | Breed | ..................... B25B 11/00 269/254 CS |
| 1,587,181 | A | * | 6/1926 | Pomeroy | ................ D05B 81/00 269/158 |
| 1,614,852 | A | * | 1/1927 | Scharf | ..................... B23Q 3/00 269/157 |
| 1,800,209 | A | * | 4/1931 | Christopherson | ...... B23Q 17/24 269/254 CS |
| 1,869,631 | A | * | 8/1932 | Swanson | ................... B25B 1/08 269/212 |
| 2,095,196 | A | * | 10/1937 | Paquette | .............. A43D 25/066 12/125 |
| 2,712,769 | A | * | 7/1955 | Prescott | ................... D04C 3/00 248/187.1 |
| 2,821,064 | A | * | 1/1958 | Nelson | ................. B22D 25/023 269/254 CS |
| 3,978,764 | A | * | 9/1976 | Patriquin | ................ B23C 3/355 269/228 |

(Continued)

*Primary Examiner* — Daniel Howell
(74) *Attorney, Agent, or Firm* — Finnegan, Henderson, Farabow, Garrett & Dunner, LLP

(57) ABSTRACT

A clamp is disclosed for use in a key making machine. The clamp may have a stationary head guide with a slot configured to receive a key, and a pressure pad configured to engage the head guide and sandwich the key therebetween. The clamp may also have at least a first spring configured to continuously generate a force biasing the pressure pad toward the stationary head guide, a plunger configured to selectively engage the pressure pad, and a second spring configured to bias the plunger toward the pressure pad. The clamp may further have a release lever manually operable to urge the plunger away from the pressure pad and to compress the second spring.

20 Claims, 5 Drawing Sheets

(56) References Cited

U.S. PATENT DOCUMENTS 5,538,374 A * 7/1996 Cole ..................... B23C 3/35
                                                                                 409/132

2012/0243957 A1    9/2012  Drake et al.

* cited by examiner

MANUAL CLAMP FOR KEY MAKING MACHINE

RELATED APPLICATIONS

This application is based on and claims the benefit of priority from U.S. Provisional Application No. 62/256,236 entitled MANUAL CLAMP FOR KEY MAKING MACHINE that was filed on Nov. 17, 2015, the contents of which are expressly incorporated herein by reference.

TECHNICAL FIELD

The present disclosure is directed to a key making machine and, more particularly, to a manual clamp for a key making machine.

BACKGROUND

Key making machines are used to create copies of master keys. In conventional machines, a master key is mounted into a clamp and held stationary while an image of the master key is captured. The image is then used to reproduce a corresponding pattern of notches within a key blank, thereby replicating the master key.

An exemplary key making machine is disclosed in U.S. Patent Application Publication 2012/0243957 of Drake et al. that published on Sep. 27, 2012 ("the '957 publication"). In particular, the '957 publication discloses a machine that uses an optical imaging device to capture a silhouette of an inserted master key. The silhouette is measured to determine a depth, angle, and position of each tooth in the master key, and to determine if the master key includes a pattern on one side or on both sides. In order to capture the silhouette, the master key is manually secured inside the machine. Specifically, a user of the machine manually grasps a handle of a door clamp, and lifts upward to raise the door clamp against a spring bias. The master key is then placed within a slot formed in a base, and the door clamp is lowered back down onto the master key by the user. The spring bias causes the door clamp to maintain a downward force against the master key during imaging.

Although the key making machine of the '957 publication may be adequate for some applications, it may still be less than optimal. In particular, it may be difficult for the door clamp to exert enough force on the master key to keep it secure during imaging, without making raising of the door clamp overly difficult for some users. In addition, it may be possible for the master key to be misaligned and/or to be mishandled during manual insertion while the door clamp is raised.

The disclosed clamp and key making machine are directed to overcoming one or more of the problems set forth above and/or other problems of the prior art.

SUMMARY

In one aspect, the present disclosure is directed to a clamp for a key making machine. The clamp may include a stationary head guide having a slot configured to receive a key, and a pressure pad configured to engage the stationary head guide and sandwich the key therebetween. The clamp may also include at least a first spring configured to continuously generate a force biasing the pressure pad toward the stationary head guide, a plunger configured to selectively engage the pressure pad, and a second spring configured to bias the plunger toward the pressure pad. The clamp may further include a release lever manually operable to urge the plunger away from the pressure pad and to compress the second spring.

In another aspect, the present disclosure is directed to a key making machine. The key making machine may include a housing having an opening configured to receive a key, an imaging system located within the housing and configured to capture an edge profile of the key, and a cutting system located within the housing and configured to cut a biting pattern into the key. The key making machine may also include a clamp configured to secure the key during at least one of an imaging process and a cutting process. The clamp may have a stationary head guide with a slot configured to receive a key, and a pressure pad configured to engage the stationary head guide and sandwich the key therebetween. The clamp may also have at least a first spring configured to continuously generate a force biasing the pressure pad toward the stationary head guide, a plunger configured to selectively engage the pressure pad, and a second spring configured to bias the plunger toward the pressure pad. The clamp may further have a release lever manually operable to urge the plunger away from the pressure pad and to compress the second spring.

In another aspect, the present disclosure is directed to a method of clamping a key within a machine. The method may include pressing a lever to reduce a spring bias urging a pressure pad toward a head guide. The method may also include inserting a key between the pressure pad and the head guide, causing the pressure pad to move away from the head guide against a spring bias. The method may further include releasing the lever to increase the spring bias clamping the key between the pressure pad and the head guide during at least one of an imaging process and a cutting process performed on the key.

DETAILED DESCRIPTION

Figure 1:
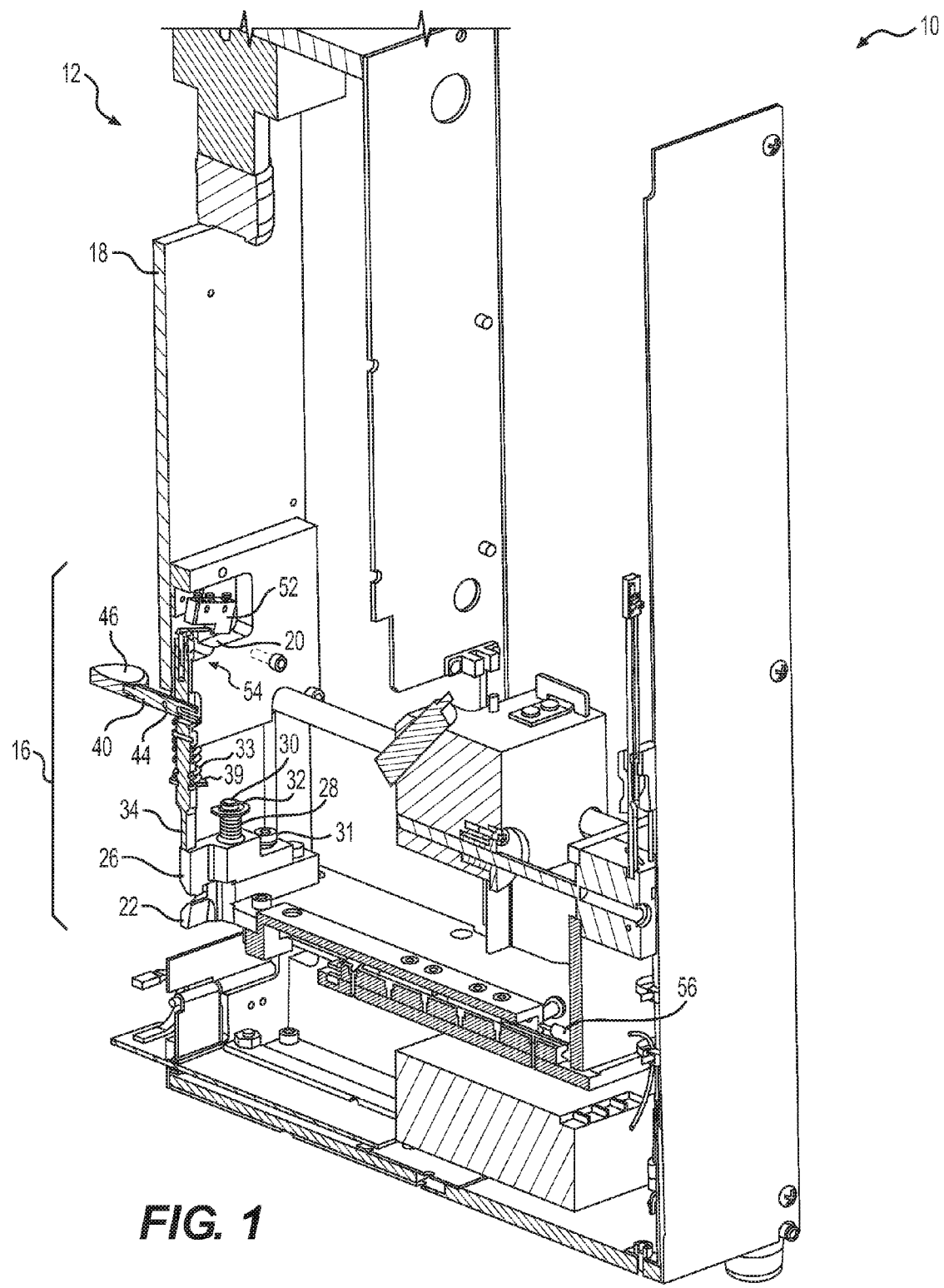
FIG. 1 is a cutaway view illustration of an exemplary disclosed key making machine.

FIG. 1 illustrates an exemplary key making machine ("machine") 10 that can be used to fabricate a copy of an existing master key from a corresponding key blank. For example, machine 10 may be used to capture an edge profile of the master key and/or to create within the key blank a biting pattern corresponding to the edge profile. In the disclosed embodiment, machine 10 includes an imaging system 12 configured to generate the edge profile of the master key, and a clamp 16 configured to secure the master key during profile generation. Imaging system 12 and clamp 16 may be co-located within a common housing 18, portions of which have been removed from FIG. 1 for clarity. It is contemplated that machine 10 could include additional or alternative systems (e.g., a cutting system, an inventory system, a debris removal system, etc.), if desired. For example, clamp 16 could additionally or alternatively be used to secure the key blank during biting profile generation by the cutting system. For the purposes of this disclosure, the term "key" will be used throughout the remainder of this disclosure to generically represent the master key and/or the key blank.

Figure 2:
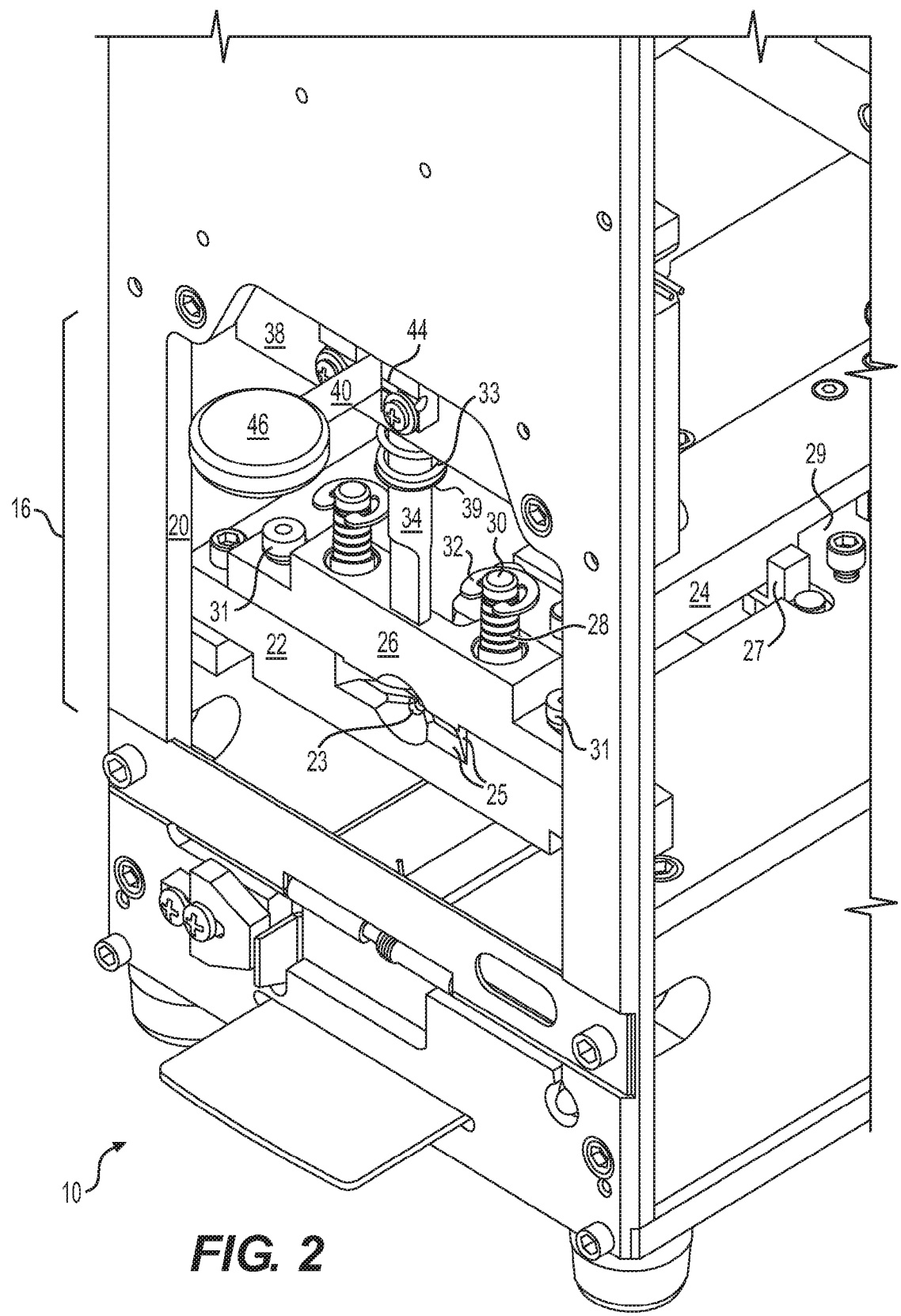
FIG. 2 is an isometric view illustration of an exemplary disclosed clamp that may form a portion of the key making machine of FIG. 1.
Figure 3:
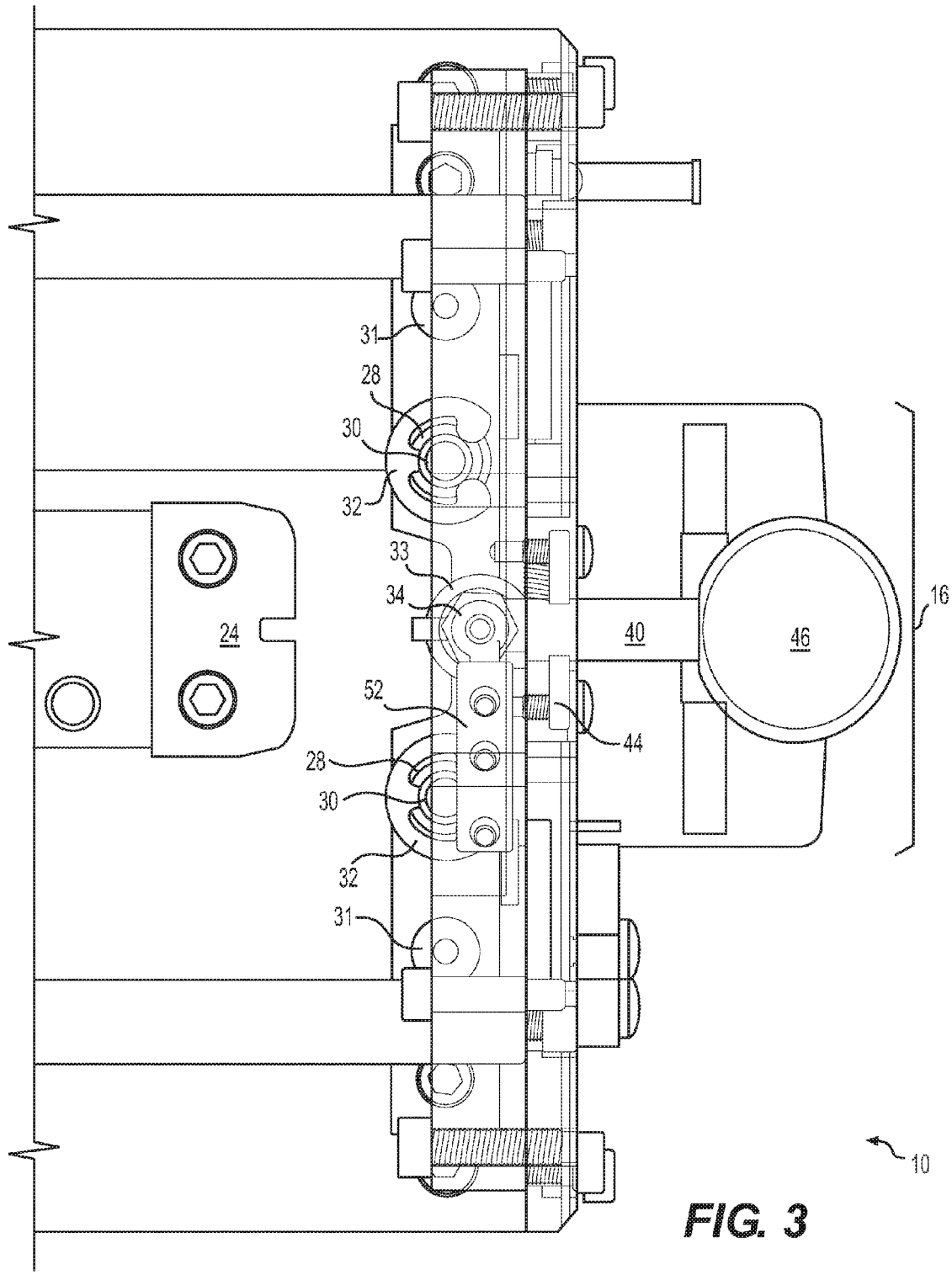
FIG. 3 is a top plan view of the clamp of FIG. 2.
Figure 4:
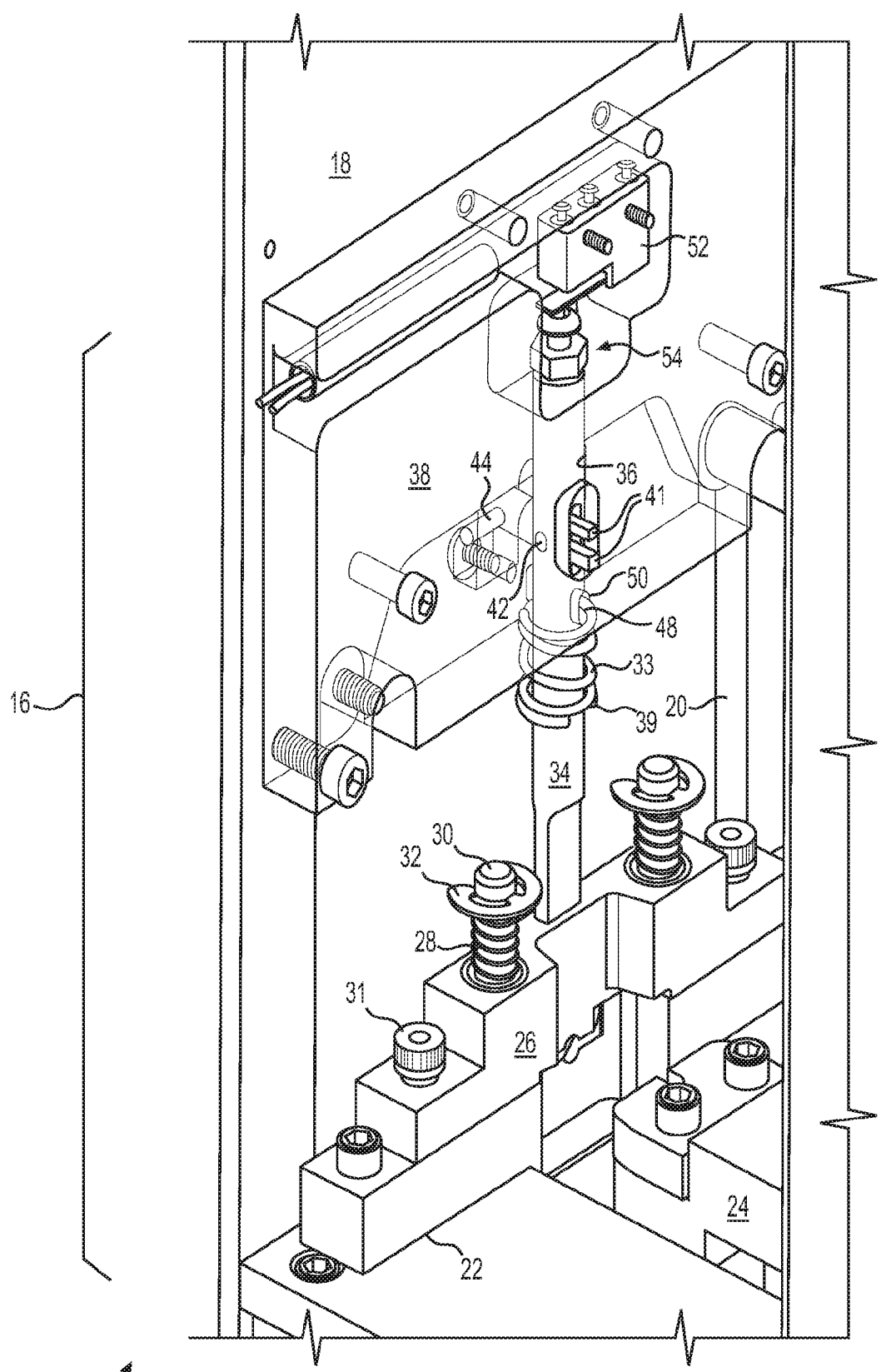
FIG. 4 is a perspective illustration of the key making machine and clamp of FIGS. 1-3, from an internal perspective.

An exemplary embodiment of clamp 16 is shown in FIGS. 2-4. As is shown in these figures, an opening 20 may be formed in a front panel of housing 18 to provide user-access to clamp 16; a fixed head guide 22 having an internal slot 23 may be positioned at opening 20; and a movable tip guide 24 may be positioned behind head guide 22. Each of these components may cooperate to receive the key as it is inserted by the user shank-first through opening 20. Edges 25 of slot 23 may be beveled inward toward a general center such that, as the key is inserted, the head of the key may engage the bevels and be urged toward the center (i.e., toward greater alignment with tip guide 24). The key may be inserted until the head engages lateral sides of head guide 22 to about the same degree. In most applications, this engagement should result in the key being lengthwise aligned with tip guide 24 (e.g., within a desired angle). Tip guide 24 may slide from opening 20 inward to a desired imaging/cutting position during and/or after insertion of the key into head guide 22. In some embodiments, a sensor 27 (e.g., an optical sensor—shown only in FIG. 2) may be used to detect movement of tip guide 24 and thereby trigger activation of machine 10. For example, sensor 27 may be configured to generate a beam of energy that passes through a corresponding gap 29 in tip guide 24 at a time when tip guide 24 is situated to receive the key. As tip guide 24 is pushed inward during key insertion, gap 29 may move past sensor 27 such that the beam of energy is blocked by tip guide 24. The blocking of the beam may result in a signal being generated that is indicative of key insertion.

As the key is being loaded into head guide 22 (and into tip guide 24), the key may need to be secured to reduce misalignment and mishandling errors. For this reason, clamp 16 may further include a movable pressure pad 26 that is biased downward (relative to the perspective shown in FIGS. 2 and 4) against head guide 22 by a pair of springs 28 located at opposing ends of pressure pad 26 (i.e., at opposing sides of slot 23). Each spring 28 may internally receive a vertical guide rail 30 that passes through both of head guide 22 and pressure pad 26, and be held in place via a snap ring 32 connected to a distal end of guide rail 30. With this configuration, the head of the key may be sandwiched between a lower surface of pressure pad 26 and an upper surface of slot 23. In one embodiment, springs 28 may together apply a continuous downward force of about 3 lbs. on the head of the key. As the user pushes the key into head guide 22, pressure pad 26 may be urged by the engagement with the key upward against the bias of springs 28 and away from head guide 22. In some embodiments, one or more travel limiters 31 may be used to limit a maximum distance that pressure pad 26 may be moved away from head guide 22 during insertion of the key. It is contemplated that travel limiters 31 may be omitted, if desired, and/or that another configuration of springs 28 may alternatively be implemented to provide the continuous downward bias on pressure pad 26.

While the continuous bias of springs 28 exerted on pressure pad 26 against the head of the key may help to reduce misalignment and mishandling errors during loading, the bias may be insufficient for subsequent imaging and/or cutting processes. That is, the key may need to remain completely stationary during the subsequent process(es), and an additional temporary biasing force may be used for this purpose after the key is already located between head guide 22 and pressure pad 26. The temporary biasing force may be provided via an additional spring 33, and exerted on pressure pad 26 via a plunger 34. In particular, as shown in FIG. 4, plunger 34 may be reciprocally disposed to slide within a vertical bore 36 of a block 38 that is mounted gravitationally above pressure pad 26, and spring 33 may be compressed between a bottom surface of block 38 and a snap ring 39 that is connected to a midpoint of plunger 34. In this location, spring 33 may generate a force on plunger 34, urging plunger 34 downward against the upper surface of pressure pad 26. In the disclosed embodiment, the additional force generated by spring 33 may be about 12 lbs., making for a total of about 15 lbs. pressing down on the head of the key.

The combined forces of springs 28 and spring 33 pressing down on the key may be too large in some instances for the user to overcome simply by pushing the key into slot 23. In these instances, a mechanical advantage may be provided to help reduce the effort required from the operator. In the disclosed embodiment, the mechanical advantage is provided by way of a lever arm. Specifically, a release lever 40 may be pivotally connected at an internal end to plunger 34 via a first pivot pin 42. For example, pivot pin 42 may pass transversely through plunger 34, and release lever 40 may be forked at its internal end to receive pivot pin 42 between corresponding tines 41. Release lever 40 may also be pivotally connected to block 38 via a second pivot pin 44 that passes transversely though a shaft of release lever 40. A push button or handle 46 may be formed at an external end of the release lever shaft. In this configuration, second pivot pin 44 may function as a fulcrum, such that, when handle 46 is pushed downward by the user, plunger 34 may be pulled upwards and away from pressure pad 26 with a mechanically multiplied moment. When this occurs, the force urging pressure pad 26 toward head guide 22 may be reduced (e.g., from about 15 lbs. to about 3 lbs.). In some embodiments, a travel limit pin 48 may protrude inward from plunger 34 and pass into a window 50 formed within an inward face of block 38. The engagement of pin 48 with upper and/or lower ends of window 50 may limit a travel of plunger 34 that can be caused by the movement of release lever 40.

In some embodiments, a micro-switch 52 may be mounted at an upper end of plunger 34. As plunger 34 is pulled upward by the downward pressing of release lever 40, the upper end of plunger 34 may engage micro-switch 52. This engagement may trigger micro-switch 52 to generate a corresponding signal. Additionally or alternatively, as plunger 34 is allowed to move back downward by the release of lever 40, the upper end of plunger 34 may move away from micro-switch 52 and generate another corresponding signal. The signal(s) generated by micro-switch 52 may be used to initiate, adjust, and/or terminate an imaging process, a cutting process, and/or another key-making related process.

It is contemplated that the engagement of plunger 34 with micro-switch 52 may be adjustable, if desired. For example, an adjusting screw/nut combination 54 may be located at the upper end of plunger 34. With this configuration, a relative turn of combination 54 may affect a distance that plunger 34 protrudes towards micro-switch 52. Other adjustment mechanisms may additionally or alternatively be included.

Figure 5:
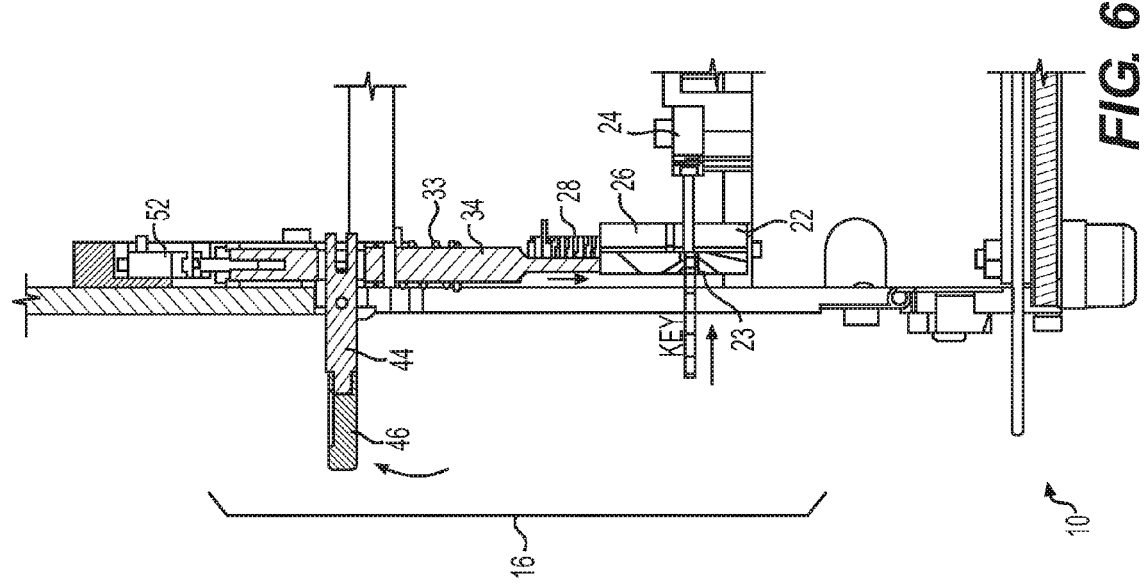
FIGS. 5 and 6 are cross-sectional side views of the clamp of FIGS. 2 and 3 shown in two different operating positions.
Figure 6:
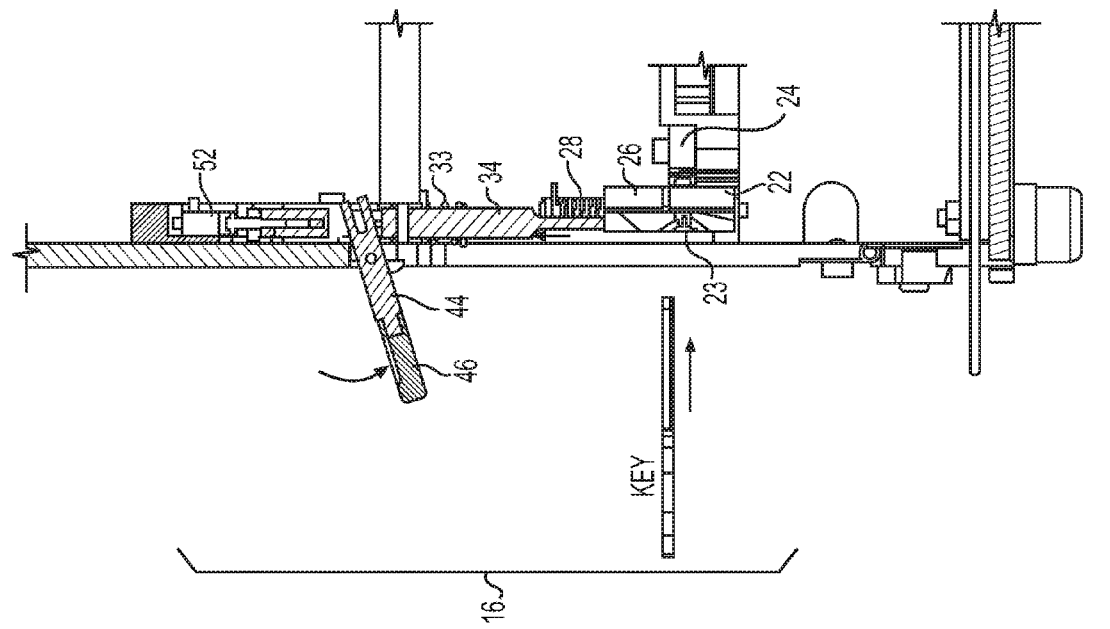

FIGS. 5 and 6 illustrate an exemplary method of clamping the key into machine 10 in preparation for an imaging process or a cutting process. FIGS. 5 and 6 will be discussed in greater detail in the following section to further illustrate the disclosed concepts.

INDUSTRIAL APPLICABILITY

The disclosed key making machine may be utilized to duplicate a master key from a key blank. The disclosed key making machine may be easy to use and produce a reduced number of mis-cuts due to the security provided by the disclosed clamp. An exemplary operation of the disclosed key making machine will now be described with reference to FIGS. 5 and 6.

As shown in FIG. 5, to begin the duplication process, a user (e.g., a customer or sales associate) may insert the master key to be duplicated through slot 23 of head guide 22. In order to reduce the force required to push the master key into slot 23, the user may simultaneously push down on handle 46, causing plunger 34 to lift upward against the bias of spring 33 and away from pressure pad 26. This may reduce the force that must be overcome by the user during key insertion to about 3 lbs. As the key is inserted through slot 23, pressure pad 26 may be urged upward against the bias of springs 28.

In some embodiments, the action of pushing down on handle 46 (or the corresponding lifting action of plunger 34) may wake (i.e., trigger activation of) the associated machine 10. In particular, as the upper end of plunger 34 engages micro-switch 52, micro-switch 52 may generate a corresponding signal causing machine to initiate an associated process (e.g., the imaging or cutting process). In other embodiments, the action of pushing the key through slot 23 (e.g., and moving tip guide 24 relative to sensor 27) may wake the associated machine 10. In yet other embodiments, a combination of signals generated by micro-switch 52 and sensor 27 may function to wake machine 10.

After the key has been fully inserted into machine 10 (i.e., after the head of the key has engaged the beveled surfaces at slot 23 and/or after the tip end of the key shank has engaged and pushed back tip guide 24), the user may release handle 46 as shown in FIG. 6. As handle 46 is released, plunger 34 may be urged back downward and against the upper surface of pressure pad 26. This engagement may allow spring 33 to add about 12 lbs. to the force already being exerted by springs 28 on the head of the key, and result in security of the key sufficient for the imaging and/or cutting processes to commence. It is contemplated that the downward movement of plunger 34 may cause disengagement from micro-switch 52 and that micro-switch 52 may generate a corresponding signal used to additionally or alternatively control one or more automated processes.

After the shank of a master key is inserted into machine 10, imaging system 12 (referring to FIG. 1) may be triggered to capture one or more images of the shank. The images may show, among other things, an edge profile of the shank. After the shank of a key blank is inserted into machine 10 or another machine, an associated cutting system may be triggered to cut a biting pattern into the shank that matches the edge profile of the master key.

To remove the key from clamp 16 (e.g., after the imaging and/or cutting process is complete), the user may again press down on handle 46 to reduce the forces holding the key secure inside slot 23. This may reduce the clamping forces from about 15 lbs. to about 3 lbs. Thereafter, the user may pull the key out of slot 23 with little effort, and then release handle 46.

In some embodiments, tip guide 24 may be spring-biased toward slot 23, to facilitate retrieval of the key by the user at the end of an associated process. In particular, tip guide 24 may actually push the key back through slot 23 when the clamping forces have been reduced in the manner described above. In these configurations, in order to inhibit tip guide 24 from completely ejecting the key out of machine 10 (e.g., to keep the key from falling to the floor when not properly grasped by the user), a dashpot 56 (shown only in FIG. 1) may be used to dampen the returning motion of tip guide 24.

It will be apparent to those skilled in the art that various modifications and variations can be made to the disclosed clamp and key making machine. Other embodiments will be apparent to those skilled in the art from consideration of the specification and practice of the disclosed clamp and key making machine. It is intended that the specification and examples be considered as exemplary only, with a true scope being indicated by the following claims and their equivalents.

What is claimed is:

1. A clamp for a key making machine, comprising:
a stationary head guide having a slot configured to receive a key;
a pressure pad configured to engage the stationary head guide and sandwich the key therebetween;
at least a first spring configured to continuously generate a force biasing the pressure pad toward the stationary head guide;
a plunger configured to selectively engage the pressure pad;
a second spring configured to bias the plunger toward the pressure pad; and
a release lever that is manually operable to urge the plunger away from the pressure pad and compress the second spring.

2. The clamp of claim 1, further including:
a first pivot pin configured to connect the release lever to a housing of the key making machine; and
a second pivot pin connecting the release lever to the plunger.

3. The clamp of claim 1, further including at least one motion limiter configured limit a distance that the pressure pad moves away from the stationary head guide.

4. The clamp of claim 1, wherein the at least a first spring includes two springs located at opposing ends of the pressure pad.

5. The clamp of claim 4, further including:
guide rails extending from the stationary head guide through the pressure pad; and
clips configured to retain the two springs on the guide rails.

6. The clamp of claim 1, wherein the stationary head guide includes surfaces at the slot that bevel inward toward the slot.

7. The clamp of claim 1, wherein the second spring is configured to exert about four times as much force on the pressure pad than the at least a first spring.

8. The clamp of claim 1, further including a motion limiter configured to limit a distance that the plunger moves away from the pressure pad.

9. The clamp of claim 1, further including a micro-switch configured to generate a signal indicative of movement of the plunger.

10. The clamp of claim 9, further including an adjustment mechanism disposed on an end of the plunger adjacent the micro-switch, the adjustment mechanism configured to adjust engagement of the plunger with the micro-switch.

11. A key making machine, comprising:
a housing having an opening configured to receive a key;
an imaging system located within the housing and configured to capture an edge profile of the key; and a clamp configured to secure the key during an imaging process, the clamp including:
- a stationary head guide located adjacent the opening in the housing and having a slot configured to receive the key;
- a pressure pad configured to engage the stationary head guide and sandwich the key therebetween;
- at least a first spring configured to continuously generate a force biasing the pressure pad toward the stationary head guide;
- a plunger configured to selectively engage the pressure pad;
- a second spring configured to bias the plunger toward the pressure pad; and
- a release lever manually operable to urge the plunger away from the pressure pad and to compress the second spring.

12. The key making machine of claim 11, further including:
- a first pivot pin configured to connect the release lever to a housing of the key making machine; and
- a second pivot pin connecting the release lever to the plunger.

13. The key making machine of claim 11, further including at least one motion limiter configured to limit a distance that the pressure pad moves away from the stationary head guide.

14. The key making machine of claim 11, wherein the stationary head guide includes surfaces at the slot that bevel inward toward the slot.

15. The key making machine of claim 11, wherein the second spring is configured to exert about four times as much force on the pressure pad than the at least a first spring.

16. The key making machine of claim 11, further including a motion limiter configured limit a distance that the plunger moves away from the pressure pad.

17. The key making machine of claim 11, further including a micro-switch configured to generate a signal indicative of movement of the plunger.

18. The key making machine of claim 11, further including:
- a tip guide configured to receive a shank tip of the key when the key is inserted through the slot of the stationary head guide;
- a spring configured to bias the tip guide toward the stationary head guide; and
- a sensor configured to detect motion of the tip guide.

19. The key making machine of claim 11, further including:
- a tip guide configured to receive a shank tip of the key when the key is inserted through the slot of the stationary head guide;
- a spring configured to bias the tip guide toward the stationary head guide; and
- a dashpot configured to dampen motion of the tip guide.

20. A method of clamping a key within a machine, comprising:
- pressing a lever to reduce a spring bias urging a pressure pad toward a head guide;
- inserting a key between the pressure pad and the head guide, causing the pressure pad to move away from the head guide against a spring bias; and
- releasing the lever to increase the spring bias clamping the key between the pressure pad and the head guide during at least one of an imaging process and a cutting process performed on the key.

* * * * *